United States Patent [19]
Tontini

[11] 3,739,984
[45] June 19, 1973

[54] THRUST AUGMENTING AND SOUTH SUPPRESSING APPARATUS AND METHOD

[75] Inventor: Remo Tontini, San Diego, Calif.

[73] Assignee: Rohr Industries, Inc., Chula Vista, Calif.

[22] Filed: Aug. 25, 1971

[21] Appl. No.: 174,629

Related U.S. Application Data

[63] Continuation-in-part of Ser. No. 137,630, April 26, 1971, which is a continuation of Ser. No. 866,641, Oct. 15, 1969, abandoned.

[52] U.S. Cl.... 239/265.17, 239/265.19, 239/265.29
[51] Int. Cl........................ B63h 25/46, B64c 15/10
[58] Field of Search................. 239/265.17, 265.19, 239/265.29, 265.39

[56] References Cited
UNITED STATES PATENTS

| | | | |
|---|---|---|---|
| 3,370,794 | 2/1968 | Drewry et al. | 239/265.17 |
| 2,487,588 | 11/1949 | Price | 239/265.19 |
| 2,831,321 | 4/1958 | Laucher | 239/265.39 |
| 2,949,734 | 8/1960 | Bertin et al. | 239/265.17 |
| 3,426,972 | 2/1969 | Osburn | 239/265.17 |
| 3,463,402 | 8/1969 | Langston, Jr. | 239/265.13 |
| 3,502,288 | 3/1970 | Pavlin et al. | 239/265.17 |
| 3,611,726 | 10/1971 | Medawar | 239/265.13 |

*Primary Examiner*—Lloyd L. King
*Attorney*—George E. Pearson

[57] ABSTRACT

An aircraft jet engine is provided with an ejector nozzle which suppresses the jet noise and augments the thrust during takeoff and climb while also optimizing the thrust during cruise. The ejector nozzle is formed as a barrel or ring which is supported in operative position aft of the exhaust nozzle and defines, with the noxxle, inlet passage means for free stream air to enter and mix with exhaust gases in the mixing zone defined by the nozzle. Peripheral jet nozzle means inside the ring eject a peripheral jet stream which surrounds and accompanies the mixed gases passing therethrough, adding to the total thrust and further mixing the gases. Jet nozzle means is supplied with energized gas by conduits connected to the engine. Ejector ring is fixed in position and supported by conduits to form an integrated ejector nozzle. This is made possible by the use of the jet nozzle means which controls the effective nozzle profile and flow therethrough to minimize thrust loss in cruise to acceptable value.

12 Claims, 21 Drawing Figures

THRUST AUGMENTING AND SOUTH SUPPRESSING APPARATUS AND METHOD

CROSS-REFERENCE TO RELATED APPLICATIONS

This application is a continuation-in-part of patent application for "Thrust Control and Sound Apparatus", Ser. No. 137,630, filed Apr. 26, 1971 which is a Continuation of patent application for "Thrust Control and Sound Suppressing Apparatus", Ser. No. 866,641, filed Oct. 15, 1969, now abandoned.

BACKGROUND OF THE INVENTION

This invention lies in the field of gas turbine or jet engines which produce reaction thrust by the high velocity rearward discharge of exhaust gases from the engines. In order to obtain the maximum thrust from a simple engine a great deal of study and calculation goes into the design of the exhaust nozzle, and for best results it must be tailored to the particular installation, taking into account the weight, speed, and other operating characteristics of the airplane on which it is mounted.

One way of increasing the thrust of such an engine is to design it so that the compressor delivers more air than the turbine uses, the excess flowing around the outside of the turbine and joining the turbine exhaust. The mixing of the two gases adds mass to the thrust producing stream and reduces the velocity and temperature thereof, which also reduces the noise level.

Another system which is used extensively includes the provision of an ejector ring which is larger than the exhaust nozzle outlet and is located aft of the nozzle. Free stream air enters the flow path between the exhaust nozzle and the ring and mixes with the exhaust gas, and also with the fan air if the engine is of the fan type. All of the gases mix within the ring with the same general effects mentioned above.

To attain optimum thrust under varying flight conditions of power and speed, the exhaust nozzle is often designed with means to translate the ejector ring to a stowed position, or to vary the throat area or the discharge cone or both, and many problems arise because of the various moving parts which must operate reliably while being subjected to the flow of the very hot exhaust gas.

SUMMARY OF THE INVENTION

The present invention is directed particularly to the type of aircraft jet engine assembly which incorporates an ejector ring with or without the addition of the fan air feature and without requiring translation of the ring. It improves the ejector action and makes it possible to use a shorter and lighter ejector ring. In addition, it augments the thrust and decreases the noise, and also allows the addition of mechanism which can perform reverse thrust and also the function of a variable nozzle with simplicity and reliability. Furthermore, the ejector ring according to the invention optimizes flow conditions to minimize shock losses under cruise conditions.

Generally stated, and in presently preferred forms, the total apparatus includes a jet engine having a rearwardly discharging exhaust nozzle which may be conical or of any other type commonly used, the engine being provided with the fan air feature if desired. An ejector ring is located aft of the nozzle and preferably with its entrance end in the vicinity of the exit margin of the exhaust nozzle. Jet nozzle means are arranged peripherally around the inner wall of the ring intermediate its ends to discharge energized gas and form an auxiliary peripheral jet stream to surround and accompany the mixed gases flowing out of the ring.

The jet nozzle means may be a plurality of discrete nozzles or a single peripheral nozzle and may be supplied with gas under pressure by conduit means connected to the engine. However, in the preferred form, the forward portion of the ejector ring is hollow to serve as a plenum chamber and the jet nozzle means is in the form of a substantially continuous slot through the inner wall of the ring through which gas is discharged from the plenum chamber. The energized gas is delivered to the plenum chamber by conduit means connected at their forward ends to the exhaust nozzle and at their aft ends to the plenum chamber, and they may carry turbine gas or fan air or both. They also serve as support means to connect the ejector ring to the engine. The performance of the ring is such that it need not be movably mounted for stowing and deploying. Thus the conduits serve as rigid means to mount the ring fixedly with respect to the engine to constitute it an integrated ejector nozzle.

The ejector ring provided with the peripheral jet nozzle means is highly effective to improve performance in all flight regimes such as landing and takeoff while also minimizing thrust loss at cruise. If desired in particular installations, the trailing edge may be provided with movable vanes or flaps to modify the nozzle profile. The ejector ring, moreover, may employ thrust reverser which may also be adjusted slightly to provide limited nozzle profile modification.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENTS

Figures 1, 2, 3:
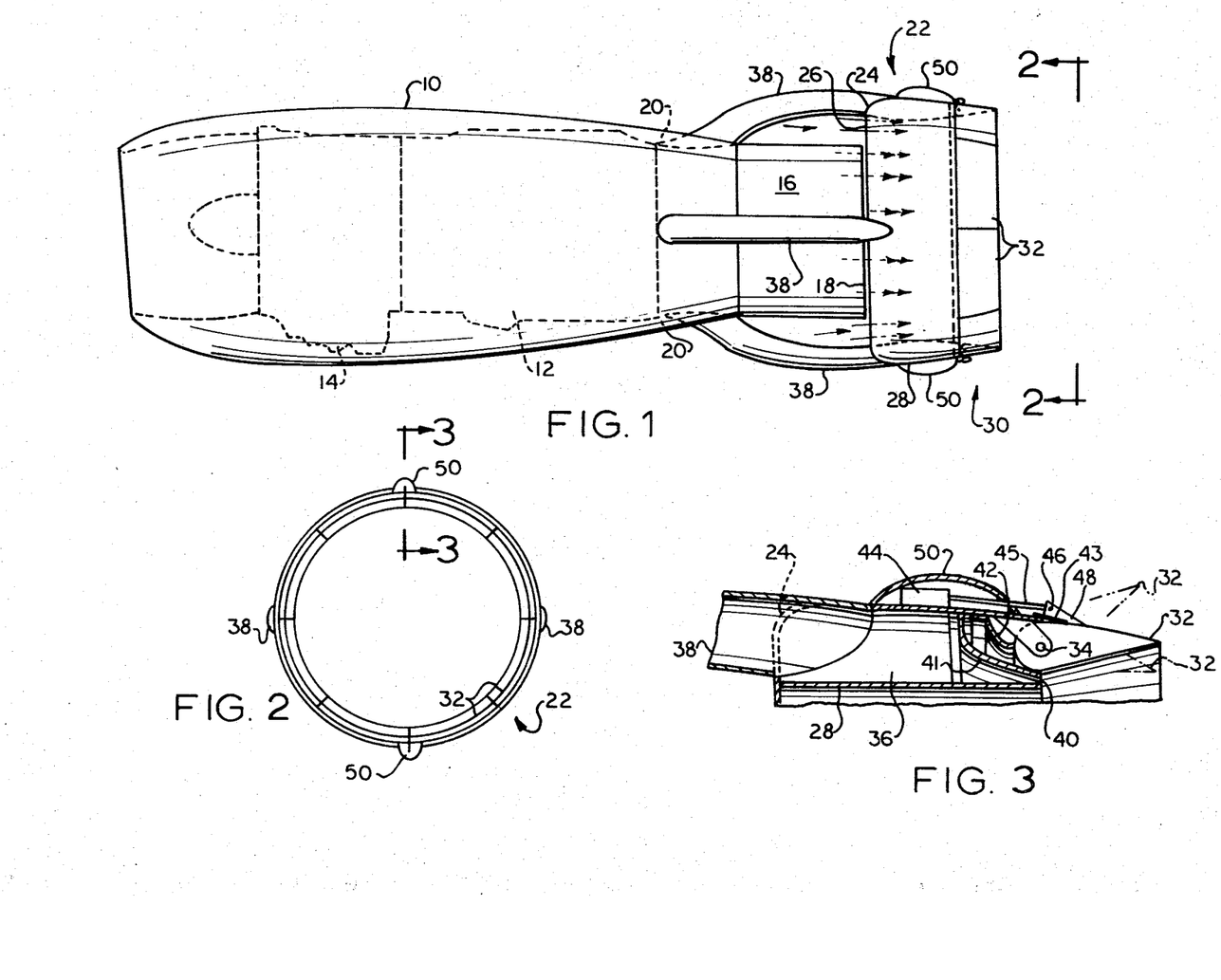
FIG. 1 is a schematic side elevational view of an engine installation incorporating the apparatus of the invention, the ejector ring having trailing edge vanes or flaps.
FIG. 2 is an end elevational view of the apparatus of FIG. 1 taken on the line 2—2.
FIG. 3 is an enlarged schematic sectional view taken on line 3—3 of FIG. 2.

The assembly shown schematically in FIG. 1 includes a housing 10 enclosing an engine 12 and a compressor 14 driven by a turbine. A nozzle 16 is attached to the turbine to receive exhaust gas therefrom and discharge it rearwardly from its exit margin 18 which preferably lies in a plane perpendicular to the axis of the compressor, engine and nozzle. A compressor may be designed to deliver more air than the turbine requires, and the excess flows rearwardly within housing 10 to discharge it at 20 into the nozzle where it mixes with the turbine exhaust gas to add mass, cool the mixture, and lower the noise level.

An ejector ring 22, which is preferably annular, is mounted coaxially aft of the nozzle with its leading edge 24 preferably in about the same plane as the exit margin 18 of the nozzle. The ring is substantially larger than the nozzle to provide an annular inlet flow passage 26 for free stream air to enter and mix with the gases issuing from the nozzle. The intermediate section 28 of the ring defines the mixing zone where the free stream air meets the other gases, and the contour of the ring is completed by a trailing section 30 comprising a plurality of peripherally arranged flaps 32 pivoted at their forward ends by pivot means 34 to the aft or trailing edge of the intermediate section.

The intermediate section 28 of the ring is hollow to form an annular plenum chamber 36 as shown in FIG. 3, and the ring is mounted to the engine by a plurality of peripherally spaced conduits or tubes 38 which, as shown in FIG. 1, connect at their forward ends with the nozzle adjacent to the turbine and at their aft ends with the forward portion of the ring. The conduits receive exhaust gas or a mixture of exhaust gas and fan air from the engine and deliver it at high pressure to the plenum chamber.

Returning to FIG. 3, it will be seen that the plenum chamber is open at its trailing edge to form a plurality of peripherally arranged slots or a single peripheral slot 40 which discharges gas from the plenum chamber rearwardly in a substantially cylindrical auxiliary peripheral jet stream which surrounds the gas mixture issuing from the mixing zone and acts as a virtual rearward continuation of the ejector ring. Thus it surrounds and controls the mixture and causes further intimate mixing to further reduce the noise level.

More particularly, the aft end of ring 22 is formed with a wall 44 which extends radially inwardly from the outer wall of said ring and then curves in the downstream direction, the forward ends of flaps 32 being disposed between the aft ends of said wall 41 and said outer wall. A flexible wall 42 is attached to the inner surface of the outer wall of the ring and to the forward ends of the flaps, and a flexible sheet 43 is attached to the aft edge of said outer wall and extends over the forward portions of said flaps. Thus free stream air is prevented from reaching the points on the flaps where exhaust gas, or a mixture of exhaust gas and fan air, flows from slot 40. Since the inner surfaces of the flaps are substantially in alignment with the slot, the peripheral jet stream flowing from the latter attaches to said flaps by virtue of the Coanda effect. Because of this attachment, the peripheral jet stream will follow the adjacent walls of the flaps and as they are swung toward or away from the axis of the ring, the jet stream will form a rearwardly convergent or divergent cone. Since the jet stream acts as a continuation of the ring it effectively changes the contour of the ring to provide any desired throat configuration.

The flaps may be adjusted to any desired angle in flight by means of one or more servo motors 44 which act through links 45 pivotally connected at 46 to control horns 48. A streamlined cover 50 is provided for each servo motor. All of the flaps are mounted in overlapping relation so that there is no peripheral gap at any angle of adjustment. The overlapping relation also insures that they will all move in unison.

Figure 4:
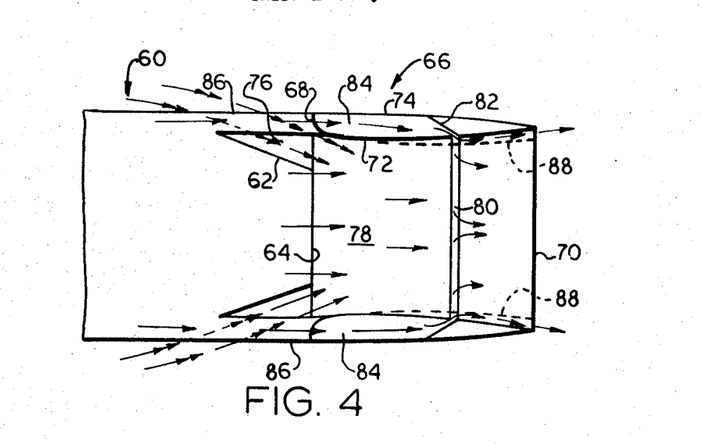
FIG. 4 is a fragmentary schematic view in longitudinal section of an engine installation in which the apparatus of the invention is applied to a conical exhaust nozzle.

An installation incorporating the invention in its simplest form is shown schematically in FIG. 4, in which a jet engine, not shown, is provided with a rearwardly discharging exhaust nozzle 60 having a conical exit section 62 terminating in a trailing edge 64. An ejector member 66 commonly referred to as a ring or nozzle or barrel, is located in operative position aft of the exhaust nozzle 60, with its entrance end 68 located adjacent to the exit plane of the nozzle, its exact fore and aft position being determined for each installation in accordance with operating requirements. The exit end or trailing edge 70 defines the discharge passage for all of the thrust producing gas stream. The ring is generally hollow and is defined by inner and outer walls 72 and 74.

The leading end 68 is spaced from the conical section 62 to define inlet path means 76 for the flow of free stream air into the mixing zone 78 defined by the interior of the ejector ring, where it meets and mixes with the turbine gas exiting from nozzle section 62 as they pass together through the ejector ring. The free stream air adds mass to the turbine gas and the velocity of the total stream is reduced. In addition, since the free stream air is much cooler, the temperature of the final gas mixture is greatly reduced. These factors augment the thrust and substantially reduce the noise level at exit 70.

While these are desirable improvements resulting from the presently known and used ejector barrel constructions, they still leave much to be desired. The efficiency must be increased and the noise level must be further decreased. The conventional ejector barrel produces an unacceptable thrust loss at cruise because of the shock condition resulting from the very high ratio of pressure and flow speeds between the nozzle gases and the entering free air stream. Consequently, conventional ejector barrels must be retracted for cruise with a substantial penalty in the form of weight, complication, and maintenance cost of the components required to stow and deploy the barrel and support it adequately in deployed position.

The present invention overcomes these disadvantages by the provision of auxiliary jet nozzle means peripherally arranged around the inner wall 72 of the ejector ring intermediate its ends to discharge energized gas around the periphery of the gaseous mixture flowing through the ring. The jet nozzle means may be a plurality of separate nozzles or a single nozzle and may be a separate component mounted in the passage and may be supplied by any conduit means carrying high pressure gas to it from the exhaust nozzle. However, in its most preferred form, it comprises a continuous peripheral slot 80 through the inner wall 72 and communicating with the interior of the ring.

Separate plenum means may be mounted in the ring but preferably a peripheral partition wall 82 extends entirely around the ring and from its inner wall 72 to its outer wall 74 to form plenum chamber 84 within the forward portion of the ring. Conduit means 86 are connected at their forward ends to the exhaust nozzle and at their aft ends to the plenum chamber to supply pressurized exhaust gases to the jet nozzle means 80. The ring is maintained in the deployed position at all times and the conduits 86 are used to rigidly support it in such position.

Partition 82 is preferably formed to converge rearwardly as shown, with the result that the gases issuing from the jet nozzle means have a substantial rearward component. The peripheral outflow performs several important functions. It forms a gaseous shield around the jet stream which serves as a virtual elongation of the ring and reduces noise emission at angles to the thrust axis. It energizes and speeds up the boundary layer to improve the free air stream inflow, in effect pumping in additional air at a higher speed and decreasing the shock effect. By increasing the speed of the radially outer portion of the jet stream, it improves the velocity profile as will be discussed later with respect to some of the other figures in the drawings. It also produces or controls the effective nozzle profile and effective exit area as indicated by broken lines 88. By proper advance testing and design the configuration of the jet nozzle slot can be selected so that the virtual nozzle profile and exit area will approach the ideal with the flow and pressure characteristics of cruising flight.

Figure 5:
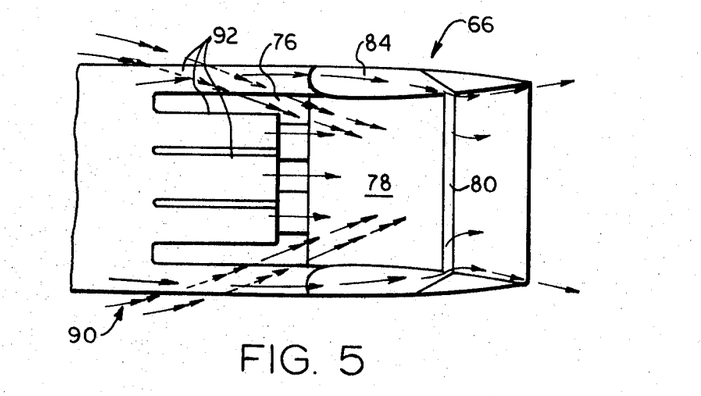
FIG. 5 is a view similar to FIG. 4 showing a multiple tube exhaust nozzle.

The installation shown in FIG. 5 is substantially the same as that of FIG. 4 but the exhaust nozzle is of the multiple tube type in which nozzle 90 is provided with a plurality of tubes 92 which are radially and peripherally spaced from each other to divide the exhaust flow into a plurality of individual streams, the nozzle area between the tubes being closed off. Ring 66 may be connected to and supported by two or more of the radially outermost tubes which will conduct gases from the nozzle to the plenum chamber 84. The inlet flow path 76 is defined between ring 66, nozzle 90, and the outer tubes, and the total operation is the same as that described with reference to FIG. 4.

Figure 6:
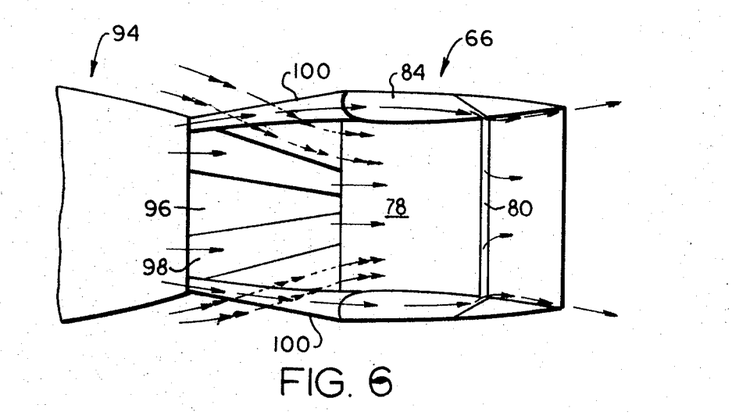
FIG. 6 is a view similar to FIG. 4 showing a lobed exhaust nozzle.

The installation of FIG. 6 is also substantially the same as that of FIG. 4 but in this case the nozzle 94 is of the well known lobe type in which the aft portion of the nozzle is formed into a plurality of peripherally spaced radially and axially extending lobes 96 defining valleys 98 between them which serve as the inlet flow paths for free stream air. Ring 66 may be mounted by conduits 100 which will conduct gases from the nozzle to plenum chamber 84, or the ring may be mounted to the trailing edges of the lobes and open to at least some of them to receive energized gases.

Figure 7:
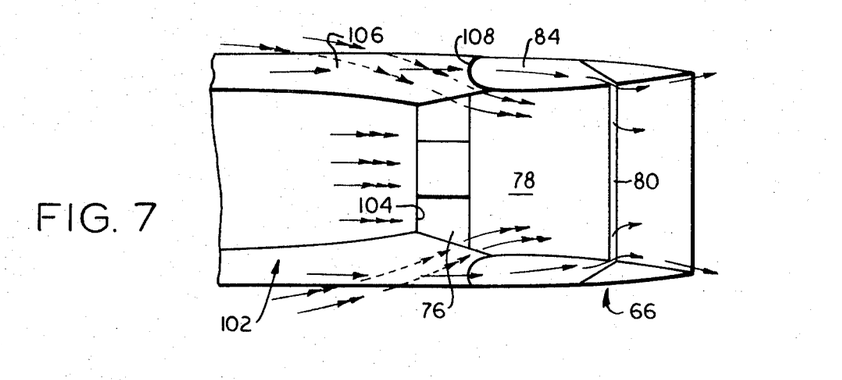
FIG. 7 is a view similar to FIG. 4 showing a conical nozzle and a fan air duct.

The installation of FIG. 7 is similar to that of FIG. 4 but in this case the engine is of the fan type and is provided with a nozzle 102 having a trailing edge 104. A fan air passage 106 is located adjacent to nozzle 102 and may extend partially or completely around the nozzle as shown. It extends aft of the nozzle and has an exit at 108 where the free stream air joins and mixes with the turbine gas in mixing chamber 78. The aft portion of passage 106 is peripherally interrupted to define inlet flow paths 76 for free stream air and is connected to ring 66 to support it and to supply fan air under pressure to plenum chamber 84 for the jet nozzle means 80. The operation is the same as in FIG. 4 except that the energized gas for the jet nozzle means is fan air instead of turbine gas.

Figure 8:
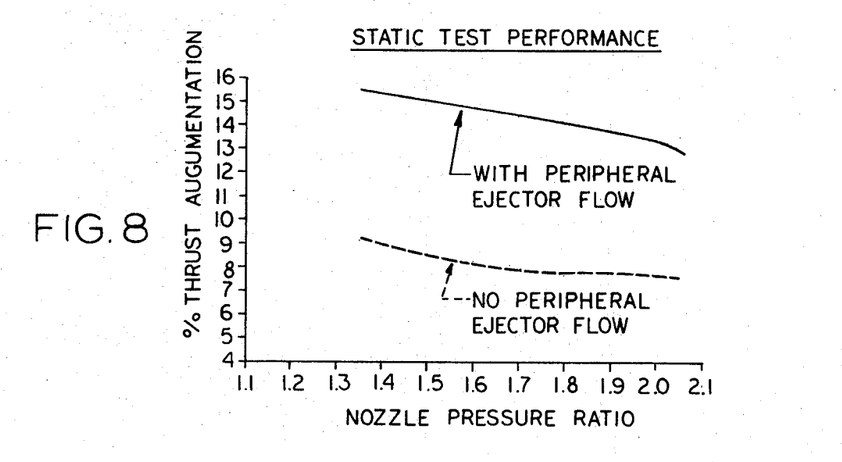
FIG. 8 is a chart illustrating the thrust augmentation achieved with the apparatus of the invention.
Figure 9:
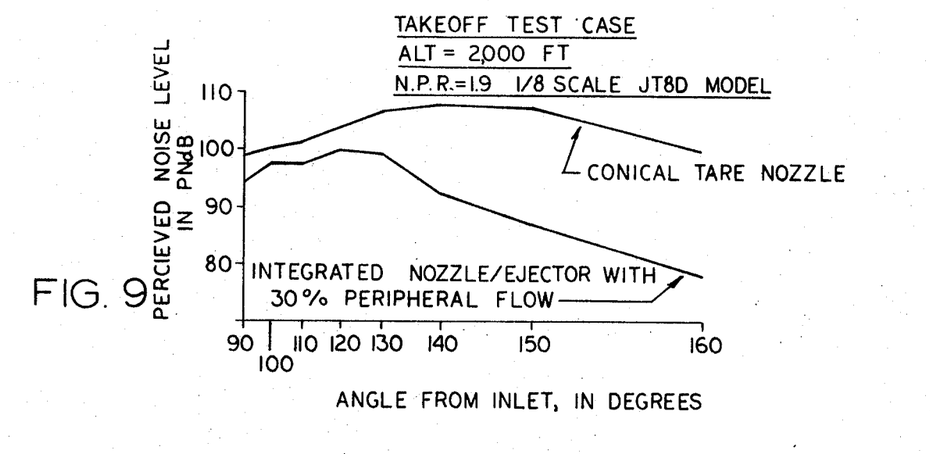
FIG. 9 is a chart illustrating the reduction in perceived noise level achieved with the apparatus of the invention.

The charts of FIGS. 8 and 9 show the improved performance of a jet engine equipped with the apparatus of the invention as opposed to previous types. In FIG. 8 it will be seen that throughout the normal range of nozzle pressure ratios an ejector ring equipped with the peripheral jet nozzle means produces a consistent and very substantial increase in thrust augmentation. In FIG. 9 it will be seen that not only does the ejector ring of the invention reduce the perceived noise level substantially below that of a conventional nozzle, but that the level drops off rapidly with increase in angle from the inlet. This means that the level is quite high only in directions more directly to the side of a passing airplane, thus greatly shortening the duration time of exposure of any fixed point to such high level. This is referred to effective perceived noise level.

Figure 10:
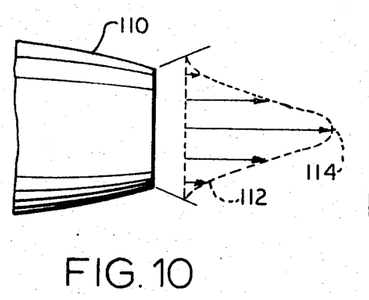
FIG. 10 is a schematic view in side elevation of a simple conical nozzle with a graphical illustration of the jet stream velocity profile.
Figure 11:
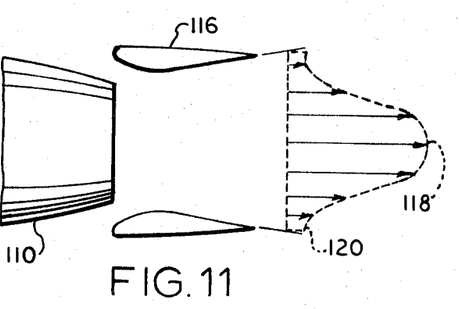
FIG. 11 is a view similar to FIG. 10 with a simple ejector ring added.
Figure 12:
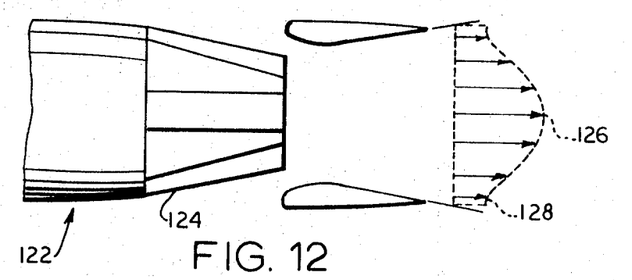
FIG. 12 is a view similar to FIG. 11 with a lobed nozzle.

FIGS. 10 to 13 illustrate the effects of different configurations on the velocity profile of the jet stream. FIG. 10 shows a plain conical or tare nozzle 110. The high friction drag of the nozzle wall greatly reduces the velocity of the peripheral portion of the stream while not affecting the axial portion. This results in the velocity profile 112 having a very high axial peak 114. The noise level is high and the thrust is conventional. In FIG. 11, a conventional ejector barrel 116 is added to bring in free stream air and mix it with the primary stream. The added mass reduces the maximum axial velocity peak 118 and increases the velocity of the peripheral portion as indicated at 120, thus flattening the profile to some extent, increasing the thrust and decreasing the noise level. In FIG. 12, the same ejector barrel is applied to a nozzle 122 having a lobed or daisy aft portion 24 which acts in a well known manner to reduce the peak and increase the peripheral portion of the jet stream. The action of the ejector barrel increases this effect and the result is the profile having a much lower peak 126 and higher peripheral portion 128.

Figure 13:
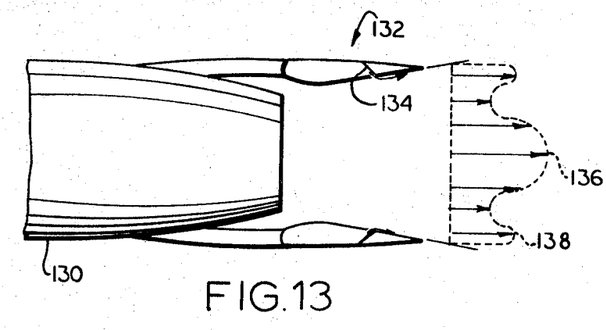
FIG. 13 is a view similar to FIG. 11 with the peripheral jet nozzle of the invention added.
Figure 14:
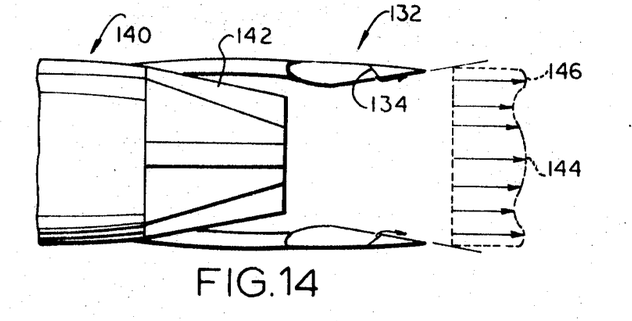
FIG. 14 is a view similar to FIG. 13 with a lobed nozzle.

In FIG. 13, a conical nozzle 130 is provided with an ejector ring 132 having peripheral jet nozzle means 134 which function in the manner previously described. The resulting velocity profile has a peak 136 which is only slightly higher than the peak 126 obtained with a lobed nozzle and a conventional ejector barrel, while the peripheral portion 138 is much higher than peripheral portion 128. Thus the improved ejector ring is as effective with a conical nozzle as a plain ejector barrel is with a lobed or daisy nozzle. Finally, in FIG. 14, ring 132 is applied to nozzle 140 having a lobed aft portion 142 and the result is an almost flat profile having an axial peak 144 and peripheral portion 146 which are almost identical. The net effect is maximum thrust with minimum noise.

Figure 15:
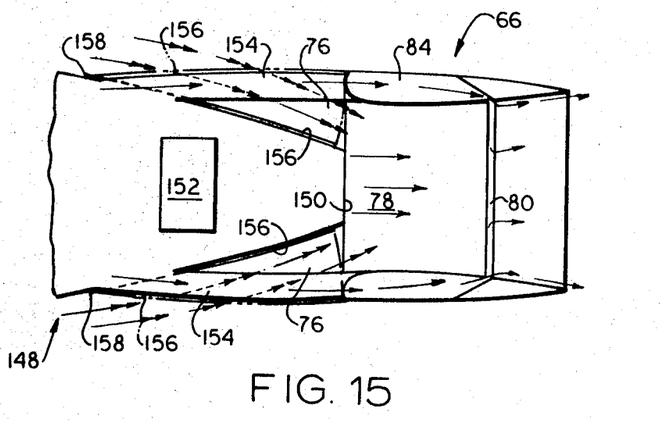
FIG. 15 is a view similar to FIG. 4 showing a conical nozzle incorporating an afterburner and air flaps.

The installation shown in FIG. 15 is basically similar to that of FIG. 4, and the ejector ring 66 is mounted and operates in the same manner. Nozzle 148 has a trailing edge 150, and an afterburner 152 is located within the nozzle upstream of the trailing edge. A plurality of fore and aft extending conduits 154 are peripherally spaced to define inlet flow paths 76, and they support ring 66 in position and also supply pressurized gas from the exhaust nozzle to plenum chamber 84. A door 156 is provided between each two conduits and is pivoted at 158 at its forward end to swing to stowed position lying against the nozzle and deployed position blocking one of the paths 76 to prevent reverse flow under the extremely high pressure of afterburner operation. When the afterburner is not in use and the doors are stowed, the apparatus operates in the manner previously described.

Figure 16:
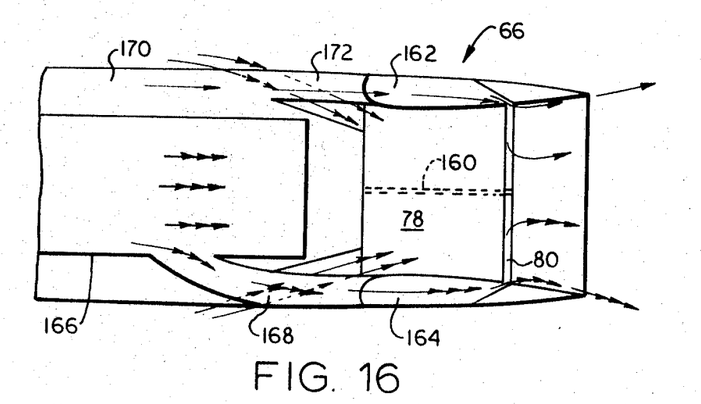
FIG. 16 is a view similar to FIG. 4 showing the use of turbine gas and fan air separately in the ejector ring.

The apparatus of FIG. 16 is equipped with substantially the same ejector ring 66 as in FIG. 4 but is modified to incorporate an additional feature. Ring 66 is provided at each side with a partition 160 extending from inner to outer wall to divide the plenum chamber into two separate compartments, upper compartment 162 and lower compartment 164. Nozzle 166 is connected by conduit 168 to compartment 164 to deliver turbine gas to the compartment and to the lower half of jet nozzle means 80. Fan air passage 170 partially or completely surrounds nozzle 166 and discharges part of the fan air into the mixing zone 78 to mix with the turbine gas in the usual manner. It is also connected by conduit 172 to the upper compartment 162 to deliver fan air to the compartment and on to the upper half of jet nozzle means 80.

With the construction just described, the ejector ring produces a complete peripheral gaseous shield surrounding the jet stream just as in the previous constructions, but in this case one half of the shield is much hotter and at a higher energy level than the other half. One of these halves is more effective to reflect sound waves inwardly toward the other gas side and to refract the sound waves which pass through it. The reflected sound waves pass more readily through one half of the shield and away from the observer. Thus the noise which was already significantly reduced by the action of the ejector ring 66 is further reflected and refracted so that the net emission toward the ground is noticeably reduced.

Figure 17:
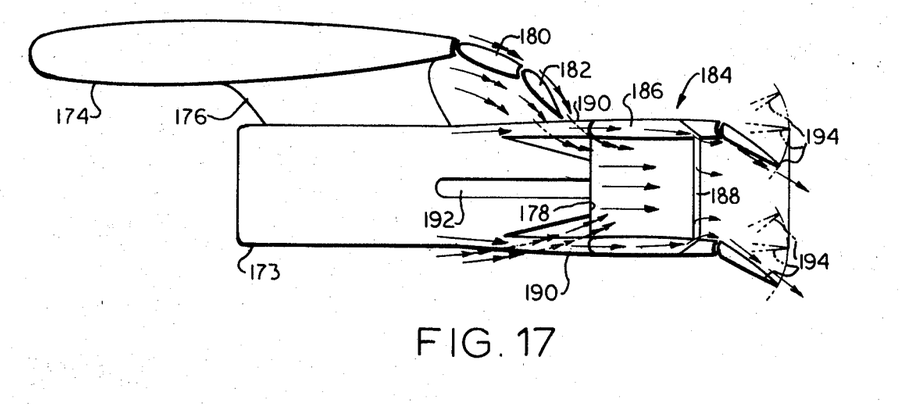
FIG. 17 is a schematic view in longitudinal section of a modified form of the apparatus mounted aft of the trailing edge of a wing.
Figure 18:
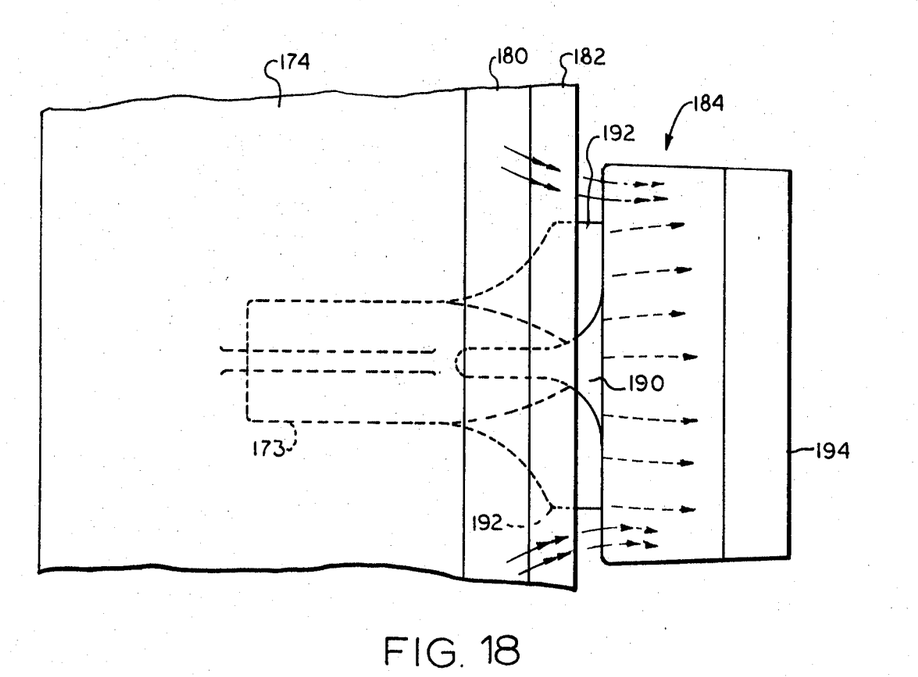
FIG. 18 is a top plan view of the apparatus of FIG. 17.

FIGS. 17 and 18 depict a slightly modified configuration in which the apparatus of the invention may be used to enhance the aerodynamic functions of an airplane on which it is mounted. An engine 173 similar to the engine of FIG. 4 is mounted beneath an airplane wing 174 by a pylon 176 in such chordwise location as to place the exit plane 178 of the nozzle slightly aft of the trailing edge of the wing, so that the air streams passing over the upper and lower surfaces of the wing and its depressed dual or tandem flaps 180, 182 are directed toward the exit plane 178.

The ejector ring 184 is of the same general nature as the ring of FIG. 4, having a plenum chamber 186 and jet nozzle means 188, and being connected to the exhaust nozzle of engine 173, by oppositely disposed conduits 190 which support the ring in place and conduct energized gases from the engine to the plenum chamber. Additional conduits 192 open into ring 184. The ring is rectangular and extends along a substantial spanwise distance. The conduits 190 and 192 are flared, conduit 192 being quite wide while the conduits 190 are fairly narrow to reduce interference with the air stream flowing down from the wing. The ejector ring operates in the same way as previously described, and its ejector action energizes the air flow over the wing and flaps to greatly increase their lifting effect. The ejector ring may further be provided with trailing edge flaps 194 which may be depressed to deflect the jet stream and produce additional lift.

Figure 19:
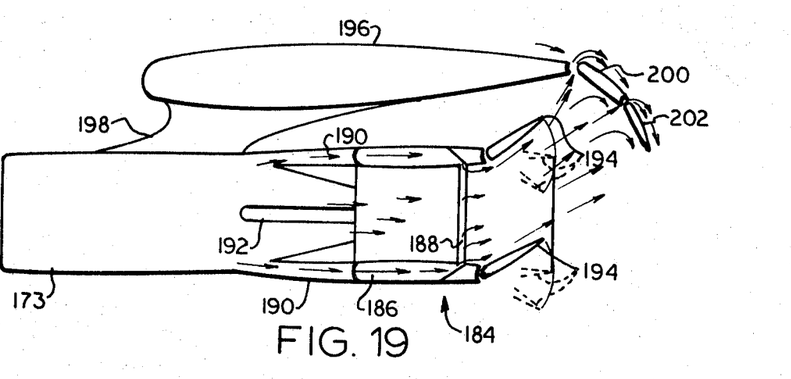
FIG. 19 is a view similar to FIG. 17 showing the engine and apparatus forward of the trailing edge of a wing.

Alternatively, the engine may be located forward in the conventional position, with the jet stream acting to improve the operation of chordwise separated high lift flaps. In FIG. 19, the engine 173 extends forward of the leading edge of wing 196 and is attached thereto by pylon 198. The ejector ring 184 takes the same rectangular form as in FIGS. 17 and 18 and may use the same conduit supports 190 and addition of conduits 192. The position of the engine is such that the entire ejector ring including its flaps 194 is forward of the chordwise separated high lift wing flaps 200 and 202. When maximum lift is desired, flaps 200 and 202 are lowered as shown and flaps 194 of the ejector ring are raised as shown. The jet stream from the ejector ring therefore is deflected upward to flow through the slots and over the upper and lower surfaces of flaps 200 and 202 to energize their boundary layers and enhance their total lifting effect. In addition to such operation, the position of flaps 194 may be modulated selectively to adjust the diffusion angle to achieve maximum performance in certain flight modes.

Figure 20:
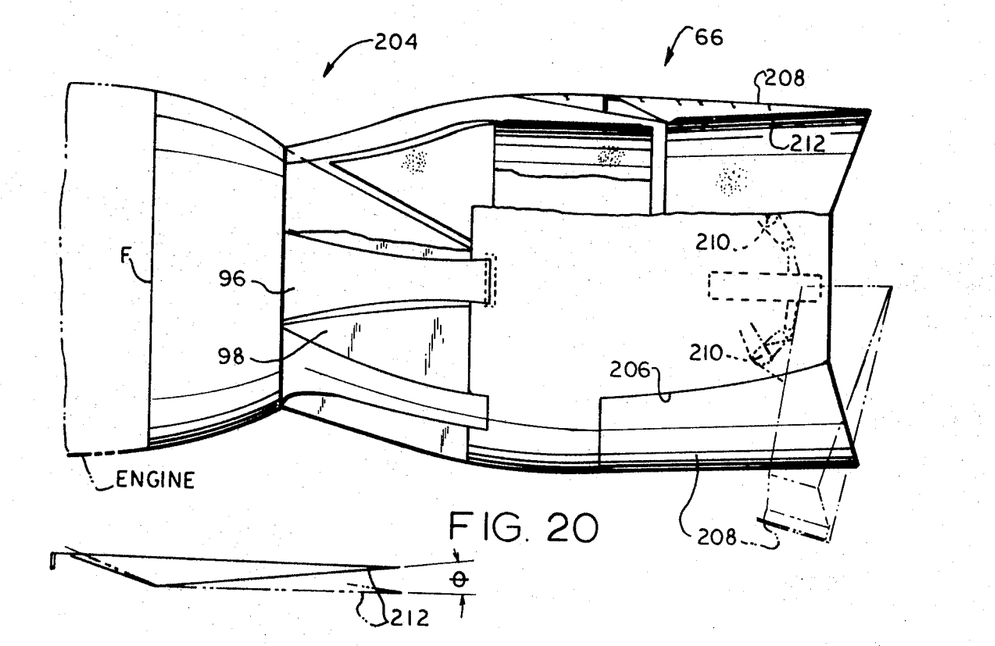
FIG. 20 is a side elevation of a structural embodiment of the nozzle configuration of FIG. 6 and including doors for thrust reversal and diffusion angle modification.

Referring to FIG. 20, there is shown a structural embodiment 204 of the integrated ejector-nozzle of FIG. 6 which features a daisy type nozzle in conjunction with the ejector peripheral nozzle. The integrated ejector nozzle 204 is a unitary structure which is attachable as a unit to the engine exhaust face F of an engine such, for example, as the Pratt and Whitney JT8D turbofan engine. Such unitary structure is shown to include a combined thrust reverser and feathering feature, presently to be described.

Passages 206 are formed in the ejector barrel 66 extending through its inner and outer walls, and blocker door 208 are located in such passages and pivoted at 210 on transverse axes. The doors are swingable rearwardly and toward each other to block rearward flow of the main jet and divert the gases laterally out through passages 206 to produce reverse thrust. Details of the thrust reverser mechanism are not a part of the present invention but are fully disclosed in U.S. Pat. No. 3,531,049 of F. Hom and U.S. Pat. No. 3,532,275 of F. Hom et al.

Figure 21:
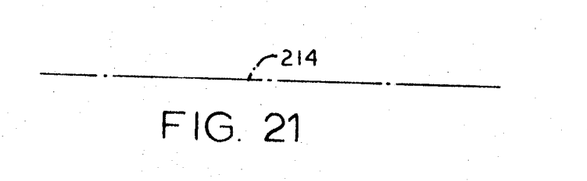
FIG. 21 is a graphical representation of the diffusion angle adjustment of the doors.

Doors 208 may be used for "feathering" by which is meant adjustment of the diffusion angle of the issuing jet. In stowed position of the doors as shown in full lines in FIG. 20, their inner surfaces 212 are disposed divergently at an angle $\theta$ with respect to the longitudinal centerline 214 of the ejector barrel, as best seen in FIG. 21. The corresponding aft inner wall of the ejector barrel diverges at the same angle θ. For feathering, the portion of the ejector wall constituted by the door surfaces 212 may be set at some angle less than θ by adjusting the doors slightly without breaking the seat with the barrel openings 206. Thus, the reverser doors may serve to limited extent to provide the feathering function of flaps 32 of FIGS. 1 to 3.

Having thus described the invention, what is claimed as new and useful and is desired to be secured by U. S. Letters Patent is:

1. Apparatus for augmenting the thrust and suppressing the exhaust noise of a jet engine having a rearwardly discharging exhaust nozzle, comprising: an ejector ring comprising an inner and outer wall and having an entrance end and an exit end; the ejector ring being located in operative position aft of the exhaust nozzle with its entrance end adjacent to the nozzle exit and spaced at least in part from the nozzle to define inlet path means for the flow of free stream air; the ring defining a mixing zone for the free stream air and the gas stream issuing from the nozzle; a plenum chamber within the ejector ring; conduit means to conduct gas under pressure from the engine to the plenum chamber, the plenum chamber being in the forward portion of the ejector ring and being formed by the forward portions of the inner and outer walls of the ejector ring and by peripheral partition means extending between the inner and outer walls of the ejector ring; and auxiliary jet nozzle means peripherally arranged around the inner wall of the ejector ring intermediate its ends to discharge energized gas from the plenum chamber into the ejector ring around the periphery of the gaseous mixture flowing through the ejector ring.

2. Apparatus as claimed in claim 1; the jet nozzle means comprising a substantially continuous peripheral slot through the inner wall of the ejector ring in flow communication with the interior of the ring.

3. Apparatus as claimed in claim 1; the exhaust nozzle being a simple conical nozzle.

4. Apparatus as claimed in claim 1; the exhaust nozzle comprising a plurality of discrete longitudinally directed tubes separating the exhaust into a plurality of separate streams for mixing with the free stream air in the mixing zone.

5. Apparatus as claimed in claim 1; the exhaust nozzle being in the form of a plurality of peripherally spaced radially and longitudinally extending lobes opening rearwardly and defining inlet paths between them for flow of free stream air.

6. Apparatus as claimed in claim 1; including passages in the aft portion of the ejector ring downstream of the jet nozzle means and extending through the inner and outer walls of the ejector ring; and a vane pivotally mounted in each passage on a transverse axis; the vanes being swingable in unison about their axes through limited angles to modify the nozzle profile and exit area of the ejector ring, and through substantially greater angles into proximity with each other and with the ejector ring axis to serve as thrust reverser doors to block rearward flow of the gases from the mixing zone and divert them laterally out through the passages to produce reverse thrust.

7. Apparatus as claimed in claim 1; the engine being of the fan type with a central nozzle to direct the turbine discharge into the radially central portion of the ejector ring; a fan air passage adjacent to the central nozzle; the forward portion of the ejector ring comprising a plenum chamber flowconnected to the jet nozzle means; the entrance end of the ejector ring being in flow communication with the fan air passage to receive at least a portion of the fan air for discharge through the jet nozzle means.

8. Apparatus as claimed in claim 1; the engine being provided with an afterburner located within the exhaust nozzle; a plurality of peripherally spaced longitudinally extending conduits connecting the ejector ring to the nozzle and providing between them a plurality of inlet passages between the nozzle and the ejector ring for flow of free stream air; and a door hinged at its forward end for each inlet passage adapted to be stowed for normal flight operation clear of the inlet passage and to be deployed to block the passage for afterburner operation.

9. Apparatus as claimed in claim 1; the engine including a central nozzle for the discharge of turbine gas and a fan air passage adjacent to the central nozzle; the forward portion of the ejector ring being hollow to define an annular plenum chamber; a radial partition extending across the chamber at each side to divide it into compartments; the jet nozzle means consisting of a substantially complete peripheral slot extending through the inner wall of the ejector ring and in flow communication with the compartments; a conduit connecting the fan air passage with one of the compartments, and a conduit connecting the central nozzle with another of the compartments.

10. Apparatus for augmenting the thrust and suppressing the exhaust noise of a jet engine located on an airplane wing provided with trailing edge lift increasing flaps; the engine having a rearwardly discharging exhaust nozzle with an exit plane adjacent to the trailing edge of the wing, comprising: an integrated ejector nozzle in the form of an ejector ring having an entrance end and an exit end; the ejector ring being located aft of the exhaust nozzle with its entrance end adjacent to the nozzle exit and below and adjacent to the trailing edge of the wing and spaced at least in part from the nozzle to define inlet path means for the flow of free stream air including air passing over the adjacent wing surfaces; the ring defining a mixing zone for the free stream air and the gas stream issuing from the nozzle; auxiliary jet nozzle means peripherally arranged around the inner wall of the ejector ring intermediate its ends to discharge energized gas thereinto around the periphery of the gas mixture flowing through the ring and increase the flow of free stream air over the adjacent wing flaps; and means to supply gas under pressure to said jet nozzle means.

11. Apparatus as claimed in claim 10; the aft portion of the ejector ring being provided with pivoted vanes swingable upward and downward to produce vertical components in the issuing jet stream.

12. Apparatus for augmenting the thrust and suppressing the exhaust noise of a jet engine located on an airplane wing provided with trailing edge lift increasing flaps deployable to chordwise spaced positions; the engine having a rearwardly discharging exhaust nozzle with an exit plane substantially forward of the flaps, comprising: an integrated ejector nozzle in the form of an ejector ring having an entrance end and an exit end; the ejector ring being located aft of the exhaust nozzle with its entrance end adjacent to the nozzle exit and its exit end forward of the flaps; the entrance end being spaced at least in part from the nozzle to define inlet path means for the flow of free stream air; the ring defining a mixing zone for the free stream air and the gas stream issuing from the nozzle; auxiliary jet nozzle means peripherally arranged around the inner wall of the ejector ring intermediate its ends to discharge energized gas thereinto around the periphery of the gas mixture flowing through the ring; and means to supply gas under pressure to said jet nozzle means; the aft portion of the ejector ring being provided with pivoted vanes swingable upward to direct the issuing gas stream toward and over the surfaces of the deployed flaps to enhance their lift producing effect.

* * * * *